US012203051B2

(12) United States Patent
Falk et al.

(10) Patent No.: US 12,203,051 B2
(45) Date of Patent: Jan. 21, 2025

(54) ACIDIC CLEANING AND DISINFECTING COMPOSITION COMPRISING CITRIC ACID, AN ANIONIC/APG SURFACTANT MIXTURE, AND GLYCOL ETHER SOLVENT

(71) Applicant: THE CLOROX COMPANY, Oakland, CA (US)

(72) Inventors: Nancy A. Falk, Bath, ME (US); David R. Scheuing, Danville, CA (US); Heather L. Day, Pleasanton, CA (US); Szu-Ying Chen, Pleasanton, CA (US); Bryan K. Parrish, Pleasanton, CA (US); Fanny Frausto, Pleasanton, CA (US); Eric G. Gharakhanian, Pleasanton, CA (US); William King, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

(21) Appl. No.: 18/360,611

(22) Filed: Jul. 27, 2023

(65) Prior Publication Data

US 2023/0365891 A1 Nov. 16, 2023

Related U.S. Application Data

(63) Continuation of application No. 17/406,461, filed on Aug. 19, 2021, now Pat. No. 11,753,603.

(60) Provisional application No. 63/068,706, filed on Aug. 21, 2020.

(51) Int. Cl.

| | |
|---|---|
| ***C11D 1/83*** | (2006.01) |
| ***C11D 1/14*** | (2006.01) |
| ***C11D 3/20*** | (2006.01) |
| ***C11D 3/43*** | (2006.01) |
| ***C11D 3/48*** | (2006.01) |
| ***C11D 3/50*** | (2006.01) |
| ***C11D 17/04*** | (2006.01) |
| *C11D 1/22* | (2006.01) |
| *C11D 1/66* | (2006.01) |
| *C11D 1/75* | (2006.01) |

(52) U.S. Cl.

CPC ................ *C11D 1/83* (2013.01); *C11D 1/146* (2013.01); *C11D 3/2044* (2013.01); *C11D 3/2079* (2013.01); *C11D 3/2086* (2013.01); *C11D 3/43* (2013.01); *C11D 3/48* (2013.01); *C11D 3/50* (2013.01); *C11D 17/049* (2013.01); *C11D 1/143* (2013.01); *C11D 1/22* (2013.01); *C11D 1/662* (2013.01); *C11D 1/75* (2013.01); *C11D 2111/14* (2024.01)

(58) Field of Classification Search

CPC .. C11D 1/02; C11D 1/12; C11D 1/143; C11D 1/146; C11D 1/29; C11D 1/66; C11D 1/92; C11D 1/83; C11D 3/042; C11D 3/2068; C11D 3/43; C11D 7/263; C11D 7/50; C11D 7/5004; C11D 7/5022; C11D 2111/14; C11D 17/049; C11D 3/22

See application file for complete search history.

(56) References Cited

U.S. PATENT DOCUMENTS

| | | | |
|---|---|---|---|
| 4,615,937 | A | 10/1986 | Bouchette |
| 4,666,621 | A | 5/1987 | Clark et al. |
| 4,781,974 | A | 11/1988 | Bouchette et al. |
| 4,931,271 | A | 6/1990 | Lang et al. |
| 4,957,908 | A | 9/1990 | Nelson |
| 5,419,908 | A | 5/1995 | Richter et al. |
| 5,436,008 | A | 7/1995 | Richter et al. |
| 5,883,066 | A | 3/1999 | Herbots et al. |
| 5,908,707 | A | 6/1999 | Cabell et al. |
| 6,221,823 | B1 | 4/2001 | Crisanti et al. |
| 6,262,038 | B1 | 7/2001 | Pierce et al. |
| 6,699,825 | B2 | 3/2004 | Rees et al. |
| 7,319,112 | B2 | 1/2008 | Haught et al. |
| 7,696,109 | B2 | 4/2010 | Ouellette et al. |
| 7,696,143 | B2 | 4/2010 | McCue et al. |
| 8,268,334 | B2 | 9/2012 | Dreilinger et al. |
| 8,993,505 | B2 | 3/2015 | Scheuing et al. |
| 9,012,389 | B2 | 4/2015 | Scheuing et al. |
| 9,273,220 | B2 | 3/2016 | Scheuing et al. |
| 9,309,435 | B2 | 4/2016 | Scheuing et al. |
| 9,474,269 | B2 | 10/2016 | Scheuing et al. |
| 9,486,800 | B2 | 11/2016 | Scheuing et al. |

(Continued)

FOREIGN PATENT DOCUMENTS

| | | |
|---|---|---|
| CL | 199501444 | 7/1996 |
| CL | 2020000754 A1 | 8/2020 |

(Continued)

OTHER PUBLICATIONS

Examiner Interview Summary Record (PTOL-413) Mailed on Jun. 20, 2023 for U.S. Appl. No. 17/406,461, 1 page(s).

(Continued)

*Primary Examiner* — Charles I Boyer
(74) *Attorney, Agent, or Firm* — Workman Nydegger

(57) ABSTRACT

The present invention is for an acidic cleaning composition which has excellent cleaning performance, low toxicity and good antimicrobial efficacy. The inventive acidic cleaning compositions are capable of sanitizing or disinfecting a variety of hard surfaces. The inventive acidic cleaning compositions can take a variety of forms, such as: disinfecting wipes, all-purpose disinfecting sprays, kitchen cleaners, bathroom cleaners, toilet cleaners, etc. The inventive acidic cleaning compositions have good cleaning properties and low residue.

16 Claims, No Drawings

(56) References Cited

U.S. PATENT DOCUMENTS

| | | | | |
|---|---|---|---|---|
| 9,593,299 | B2 | 3/2017 | Scheuing et al. | |
| 9,663,747 | B2 | 5/2017 | Scheuing et al. | |
| 9,796,872 | B2 | 10/2017 | Scheuing et al. | |
| 9,809,790 | B2 | 11/2017 | Scheuing et al. | |
| 9,976,109 | B2 | 5/2018 | Scheuing et al. | |
| 10,066,196 | B2 | 9/2018 | Scheuing et al. | |
| 10,208,275 | B2 | 2/2019 | Scheuing et al. | |
| 10,400,131 | B2 | 9/2019 | Scheuing et al. | |
| 10,563,156 | B2 | 2/2020 | Scheuing et al. | |
| 11,753,603 | B2 | 9/2023 | Falk et al. | |
| 11,959,045 | B2 | 4/2024 | Guo et al. | |
| 2002/0155969 | A1 | 10/2002 | Rees et al. | |
| 2003/0083219 | A1 | 5/2003 | Rees et al. | |
| 2004/0157524 | A1 | 8/2004 | Polat et al. | |
| 2006/0100128 | A1 | 5/2006 | McCue et al. | |
| 2006/0223735 | A1 | 10/2006 | Gaudreault | |
| 2006/0293201 | A1 | 12/2006 | Simon et al. | |
| 2008/0115302 | A1* | 5/2008 | Kilkenny | A47L 13/254 15/210.1 |
| 2010/0240752 | A1* | 9/2010 | Dreilinger | C11D 3/2086 514/557 |
| 2011/0009309 | A1 | 1/2011 | Mertens et al. | |
| 2011/0180101 | A1 | 7/2011 | Konishi et al. | |
| 2013/0157921 | A1 | 6/2013 | Marin et al. | |
| 2014/0023609 | A1 | 1/2014 | Mukherjee et al. | |
| 2015/0259625 | A1 | 9/2015 | Bureiko et al. | |
| 2016/0058005 | A1 | 3/2016 | Hazenkamp et al. | |
| 2016/0058012 | A1 | 3/2016 | Herdt et al. | |
| 2016/0208095 | A1 | 7/2016 | Zhang et al. | |
| 2016/0326462 | A1 | 11/2016 | Zhang et al. | |
| 2017/0015960 | A1 | 1/2017 | Boers et al. | |
| 2017/0258079 | A1 | 9/2017 | Kiesel et al. | |
| 2018/0002646 | A1 | 1/2018 | Larson, III et al. | |
| 2018/0027812 | A1 | 2/2018 | Bobbert | |
| 2018/0303090 | A1* | 10/2018 | Budhian | A61K 31/194 |
| 2019/0090483 | A1 | 3/2019 | Li et al. | |
| 2019/0330568 | A1 | 10/2019 | Ceulemans et al. | |
| 2020/0367492 | A1 | 11/2020 | Budhian et al. | |
| 2021/0227830 | A1 | 7/2021 | Herdt et al. | |
| 2022/0056370 | A1 | 2/2022 | Falk et al. | |
| 2022/0056374 | A1 | 2/2022 | Guo et al. | |
| 2023/0247990 | A1 | 8/2023 | Modak et al. | |
| 2024/0218289 | A1 | 7/2024 | Guo et al. | |

FOREIGN PATENT DOCUMENTS

| | | | |
|---|---|---|---|
| CL | 2023000489 | A1 | 8/2023 |
| CL | 2023000505 | A1 | 8/2023 |
| EP | 0750063 | A1 | 12/1996 |
| EP | 0783245 | B1 | 11/1998 |
| EP | 0992338 | A2 | 4/2000 |
| EP | 1303661 | A1 | 4/2003 |
| EP | 1687136 | A2 | 8/2006 |
| EP | 1861529 | A1 | 12/2007 |
| NZ | 522970 | A | 5/2004 |
| WO | 96/14835 | A1 | 5/1996 |
| WO | 97/40814 | A1 | 11/1997 |
| WO | 98/03713 | A1 | 1/1998 |
| WO | 01/94513 | A1 | 12/2001 |
| WO | 02/77348 | A1 | 10/2002 |
| WO | 2005/049316 | A2 | 6/2005 |
| WO | 2006/087427 | A1 | 8/2006 |

OTHER PUBLICATIONS

Herrera-Marques et al, "Cleaning maps: A multi-length scale stragety to approach the cleaning of complex food deposits," Journal of Cleaner Production, vol. 261, Mar. 25, 2020, 121254.

Notice of Allowance and Fees Due (PTOL-85) Mailed on Jul. 3, 2023 for U.S. Appl. No. 17/406,461, 2 pages.

Notice of Allowance and Fees Due (PTOL-85) Mailed on Jun. 20, 2023 for U.S. Appl. No. 17/406,461, 9 pages.

U.S. Appl. No. 63/068,706, filed Aug. 21, 2020.

United States Office Action from corresponding U.S. Appl. No. 17/406,341, Jun. 16, 2023.

Notice of Allowance in U.S. Appl. No. 17/406,341 mailed Dec. 13, 2023.

Non-Final Office Action received for U.S. Appl. No. 18/604,890, mailed on Sep. 19, 2024, 11 pages.

Safety Data Sheet, Sigma-Aldrich, 10-Undecenoic acid, www.sigmaaldrich.com, Nov. 4, 2024, 10 pages.

Safety Data Sheet, Sigma-Aldrich, Octanoic acid, www.sigmaaldrich.com, Jul. 27, 2024, 12 pages.

* cited by examiner

ACIDIC CLEANING AND DISINFECTING COMPOSITION COMPRISING CITRIC ACID, AN ANIONIC/APG SURFACTANT MIXTURE, AND GLYCOL ETHER SOLVENT

CROSS REFERENCE TO RELATED APPLICATIONS

The present application is a continuation under 35 U.S.C. 120 of U.S. patent application Ser. No. 17/406,461, filed Aug. 19, 2021 which claims the benefit of U.S. Provisional Patent Application Ser. No. 63/068,706, filed on Aug. 21, 2020, the disclosure of each of which is herein incorporated by reference in its entirety.

BACKGROUND OF THE INVENTION

Field of the Invention

The present invention relates generally to acidic cleaning compositions for use on hard surfaces. The inventive acidic cleaning compositions have a limited number of ingredients that are capable of sanitizing and disinfecting hard surfaces. The inventive acidic cleaning compositions can take a variety of forms, such as: disinfecting wipes, all-purpose disinfecting sprays, kitchen cleaners, bathroom cleaners, toilet cleaners, etc. The inventive compositions have good cleaning properties and low residue.

Consumers have access to more information than ever before on the properties of the ingredients used in household cleaning products. This access is clearly driving concerns about the relative safety and effects, both chronic and acute, of ingredients on human health. Thus, there is growing preference for cleaning products which are perceived as safer in use, but can still provide antimicrobial (germicidal) efficacy in cleaning and the sanitization or disinfection of the surfaces cleaned.

The formulations should deliver effective sanitization or disinfection of the surfaces where this germicidal performance is evaluated by protocols acceptable to a regulatory agency such as the U.S. Environmental Protection Agency (EPA). This means the formulations are tested for efficacy via protocols that include dispensing from the intended container, for example a spray bottle, abrasion of a known, regulated level of microorganisms dried on a surface, and evaluation of the variability of the germicidal effects across multiple replicate contaminated surfaces. For example, a suitable antimicrobial testing protocol could require testing 60 carriers with the formulation, within a regulated time of contact, such as contact times of 10 minutes or less, or 5 minutes or less, etc.

The inventive formulations typically use ingredients that are highly preferred, based on published technical criteria set by one or more regulatory agencies concerned with the effects of the cleaning solutions on both consumers and the environment. To date, there is not yet global harmonization on the list of ingredients for sanitizing and disinfecting formulations that are considered preferred for environmental and consumer safety. In the US, however, the EPA has set formula criteria and chemical ingredients which are preferred. In addition, within the US, certain states, such as California, have enacted regulations on the use of certain "volatile organic compounds" (VOCs) in cleaning products, in efforts at reducing environmental impacts of commonly used cleaning products. In some embodiments of the invention, all of the components or substantially all components of the inventive compositions meet the EPA guidelines under 40 CFR 180.940(a) which reflect a presumption of low toxicity. There is a need for efficacious cleaning compositions that deliver effective sanitization or disinfection of the surfaces which are free from less preferred germicidal compounds, including: quaternary ammonium compounds, biguanides, oxidants, triclosan, triclocarban, iodine and fluorosurfactants.

Description of the Related Art

The prior art for acidic cleaners teaches many compositions which are directed to the cleaning of hard water and soap scum or lime scale stains. Many of these are acidic, aqueous compositions which include one or more detersive surfactants. Many of the prior art acid cleaners do not provide a germicidal or sanitizing effect to the hard surfaces being treated. Of the prior art formulations that do provide a sanitizing or disinfecting benefit, it is usually because of the inclusion of one or more antimicrobial constituents, such as known cationic quaternary ammonium compounds. Quaternary ammonium compounds are well known to be effective against gram positive type pathogenic bacteria such as *Staphylococcus aureus*, and/or gram negative type pathogenic bacteria such as *Salmonella choleraesuis* and/or *Pseudomonas aeruginosa*. The inventive compositions are free from antimicrobial constituents including: biguanides, triclosan, triclocarban, quaternary ammonium compounds, ammonia, peroxide, peracetic acid, hypochlorite, or hypochlorous acid, which formulations tend to have an unpleasant or harsh odor, skin and/or eye irritation, and surface compatibility limitations. In general, the inclusion of most antimicrobial constituents is often not without one or more detriments including, but not limited to specific formulation limitations, irritation concerns, and the like.

Quaternary ammonium compounds are commonly used in disinfecting and sanitizing products because of their lower potential to damage surfaces versus hypohalites, yet have broad spectrum microefficacy. Unfortunately, demand has surged for these compounds and products containing them during the recent COVID-19 pandemic, and shortages exist for key precursors to these compounds, such as tertiary amines and alkyl benzyl chlorides. The inventive compositions do not use these precursors to obtain broad spectrum microefficacy, and thus provide critical additional antimicrobial capacity for bleach-free disinfection and sanitization for healthcare facilities, commercial spaces, and consumer usage on inanimate surfaces in and outside the home.

One aspect of the present invention is to provide sanitizing or disinfecting compositions that do not rely on use of quaternary amine compounds for sanitization or disinfection. For example, some quaternary ammonium compounds may cause skin and eye irritation at low levels and personal protective equipment (PPE) or hand washing after use may therefore be recommended or required. Acid cleaning compositions, which are effective at sanitizing and disinfecting surfaces without the addition of quaternary ammonium compounds, are needed in the field to provide an effective alternative to the prior art products available today. Accordingly, there is a real and continuing need in the art for improved hard surface treatment compositions which provide a cleaning and sanitizing or disinfecting benefit, which do not contain hypohalites, peroxides, or quaternary ammonium compounds.

U.S. Pat. No. 6,699,825, by Rees et al., assigned to S.C. Johnson and Son Inc., teaches an acidic hard-surface antimicrobial cleaner with both lactic and glycolic acids. Rees teaches using sparingly soluble glycol ether solvents in the antimicrobial cleaner, but the exemplary glycol ether solvent differs from those in the present invention because they do not meet the EPA Volatile Organic Compounds (VOCs) regulation requirements or the California Air Resources Board (CARB) VOC requirements. In addition, the upper end of the solvent level ranges (about 0.5 to 10% by weight) is too high to meet VOC requirements for a ready to use product and the toxicity profile of the solvents is much higher than those of the present invention. Rees' requirement of both lactic and glycolic acids teaches away from the present invention. In addition, Rees' invention limits the anionic surfactant in the composition to a range of 0.01 to 0.3% by weight which is substantially lower than many of the anionic surfactant ranges for the inventive compositions.

U.S. Pat. No. 8,268,334, by Dreilinger et al., assigned to Reckitt Benckiser LLC, teaches aqueous acidic hard surface cleaning and disinfecting compositions which comprise lactic acid and optionally another organic acid. Dreilinger teaches inventive hard surface cleaning compositions that contain glycol ethers and ethanol at levels that are not acceptable under current US VOCs regulations according to the EPA. The claimed inventive acidic cleaning composition requires a nonionic surfactant constituent which comprises a monobranched alkoxylated $C_{10}/C_{11}$-fatty alcohol, preferably based on a $C_{10}$ Guerbet alcohol, concurrently with at least one alkylpolyglucoside. In some embodiments the present invention does not require a nonionic surfactant. In all embodiments of the present invention the specific combination of the monobranched $C_{10}/C_{11}$ fatty alcohol and an alkylpolyglucoside is not required. In some embodiments, the lactic acid or an alkoxylated fatty alcohol surfactant is excluded from the compositions of the present invention; in other embodiments, the alkylpolyglucoside is excluded from the compositions of the current invention.

U.S. Pat. No. 7,696,143, by McCue et al., assigned to Reckitt Benckiser LLC, teaches acidic hard surface cleaners which comprise organic acids, anionic surfactants and nonionic surfactants and solvents. McCue teaches that his inventive hard surface cleaning compositions contain ethanol at levels that are not acceptable under current US VOCs regulations according to the EPA. McCue teaches that the essential ingredients of his compositions include an anionic surfactant and a range of nonionic surfactants containing ethylene oxide groups, or alkoxy block copolymers, or certain nonionic surfactants containing ethoxy, propoxy and/or butoxy groups. The present invention does not require a nonionic surfactant. In some embodiments of the present invention the acidic cleaning composition is free of a nonionic surfactant containing ethylene oxide groups or alkoxy block copolymers, or certain nonionic surfactants containing ethoxy, propoxy and/or butoxy groups.

U.S. Pat. No. 5,419,908, by Richter et al., assigned to Ecolab Inc., teaches a sanitizing composition which requires a blend of aromatic polyunsaturated carboxylic acids. Richter's inventive compositions require a blend of acids such as sorbic acid and benzoic acid. In some embodiments, Richter requires more than two organic acids. In addition, Richter's inventive compositions require a nonionic surfactant such as polyoxyethylene or polyoxypropylene copolymer, which are inconsistent with the objectives of the invention as being useful on food contact surfaces. In some embodiments of the present invention the acidic cleaning composition is free of a nonionic surfactant containing polyoxyethylene or a polyoxypropylene copolymer. Richter teaches that his inventive hard surface cleaning compositions contain ethanol at levels that are not acceptable under current US VOCs regulations according to the EPA.

U.S. Pat. No. 6,262,038, by Pierce et al., assigned to Christal David Ltd., teaches a germicidal composition which requires a blend of aromatic polyunsaturated carboxylic acids. Richter's inventive compositions require a blend of acids such as lactic, glycolic, citric, malic and tartaric acids. Pierce's germicidal composition requires the inclusion of a sophorose lipid biosurfactant in an amount of 0.1-2.0% by weight of the composition. The present invention does not require a combination or blend of carboxylic acids, nor does it require aromatic polyunsaturated carboxylic acids. In addition, the present invention does not require a sophorose lipid biosurfactant. In one embodiment of the invention, the inventive formulation is free of sophorose compounds, such as a sophorose lipid biosurfactant. Pierce's invention is directed to the germicidal cleaning of fruits, vegetables, skin and hair and is not particularly directed to cleaning of hard surfaces.

Prior art compositions do not combine effective cleaning with sanitizing and disinfection while using an acidic active component without other antimicrobial constituents. The present invention provides an acidic cleaning composition that overcomes at least some of the disadvantages and shortcomings associated with prior art cleaning compositions.

SUMMARY OF THE INVENTION

One aspect of the present invention comprises an acidic hard surface cleaning composition comprising: about 0.1 to 5% of an acid; 0.1 to 2% of an anionic surfactant; a glycol ether solvent, a fragrance; water; and optionally dyes, colorants, polymers, defoamers, builders, buffers and/or preservatives; wherein the composition contains substantially no antimicrobial compounds such as: quaternary ammonium compounds, biguanides, hypohalites or peroxides; and wherein the pH is from 2 to 6.

Another aspect of the current invention is a concentrated composition that yields the above compositions upon dilution per use instructions.

The inventive compositions have low toxicity and good cleaning performance. In addition, the inventive acid cleaning compositions are effective at sanitizing or disinfecting surfaces and can be used on a variety of hard surfaces. Furthermore, the cleaning compositions can be used in a variety of different formats, including but not limited to, disinfecting wipes, sanitizing or disinfecting all-purpose spray cleaners, kitchen cleaners, bathroom cleaners, toilet cleaners, shower and bathtub cleaners, etc.

According to one embodiment of the invention, there is provided hard surface treatment compositions which provide a cleaning and sanitizing or disinfecting benefit comprising: an acidic constituent selected from: citric acid, caprylic acid, methanesulfonic acid, or mixtures thereof; an anionic surfactant constituent selected from: sulfonate, sulfate, sultaines or any mixtures thereof; at least one glycol ether solvent; and optionally one or more further constituents selected from: nonionic surfactants, polymers, defoamers, dyes and coloring agents, fragrances and fragrance solubilizers, viscosity modifying agents, pH adjusting agents and pH buffers including organic and inorganic salts, antifoaming agents, preservatives, and anti-corrosion agents. The balance of the composition may be made up of water. In another embodiment of the invention, the inventive acidic cleaning and disinfecting composition comprises: an acidic constituent selected from: citric acid, caprylic acid, methanesulfonic acid, or mixtures thereof; an anionic surfactant constituent selected from: sulfonate, sulfate, sultaines or any mixtures thereof; a nonionic surfactant selected from: ethoxylated alcohols, propoxylated alcohols, alkoxylated alcohols (EO/PO surfactant), or any combinations or mixtures thereof; and optionally one or more further constituents selected from: nonionic surfactants, polymers, defoamers, dyes and coloring agents, fragrances and fragrance solubilizers, thickeners, viscosity modifying agents, pH adjusting agents and pH buffers including organic and inorganic salts, antifoaming agents, preservatives, and anticorrosion agents. The balance of the composition may be made up of water.

According to preferred embodiments of the invention, the inventors have surprisingly found that the inclusion of modest amounts of the specific water soluble organic acids in conjunction with the specific surfactants at final use concentrations in the largely aqueous compositions surprisingly provide a satisfactory antimicrobial effect to the hard surfaces treated with the largely aqueous compositions of the invention. This is particularly surprising as such preferred embodiments of the inventive compositions specifically exclude other antimicrobial constituents such as: quaternary ammonium compounds, hypohalites and peroxygen compounds. The inventive compositions are also expected to have a low potential for irritation as well as low toxicity levels.

The inventive compositions necessarily include an organic acid constituent such as at least one of citric acid, caprylic acid, or methane sulfonic acid. Each of these acids are water soluble, and comprises as least one carboxyl group (—COOH) in its structure. The organic acid may be present in any effective amount, but desirably for ready to use products is not present in amounts of more than about 5% wt. based on the total weight of the compositions (generally from about 0.1% to about 5% wt.). For dilutable products, the organic acid may be present at 2.0% to 90% wt. of actives in the formula, depending on the dilution factor and the use instructions. Products that are used in the presence of water, such as toilet bowl cleaning products, laundry products, and other similar products, may be considered dilutable products where the organic acid may be present at 2.0% to 90% wt. of actives in the formula. Further, the amount of acid present in the composition, keeping in mind any optional ingredients that may be present, should be in an amount such that the pH of the composition in use is less than about 7, or less than about 6, or from about 5.0 to about 1.0, or from about 4.0 to about 1.5, or from about 3.0 to about 2.0.

The dilutable product may be, without limitation, a thin aqueous liquid, a non aqueous liquid, a gel, a paste, a powder, one or more compositions contained in a water-soluble film, or a tablet. It may be a part of a delivery system that releases the concentrated composition for dilution into a ready to use disinfecting or sanitizing product. The inventive compositions may also be diluted in a bucket as a floor cleaner or into a toilet bowl for disinfection and sanitization.

Further features and advantages of the present invention will become apparent to those of ordinary skill in the art in view of the detailed description of preferred embodiments below, when considered together with the attached claims.

DETAILED DESCRIPTION OF THE INVENTION

Definitions

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, or less than 0.0001%. In some embodiments, the compositions or articles described herein may be free or substantially free from any specific components not mentioned within this specification.

As used herein, "disposable" is used in its ordinary sense to mean an article that is disposed or discarded after a limited number of usage events, preferably less than 25, more preferably less than about 10, and most preferably after a single usage event. The wipes disclosed herein are typically disposable.

As used herein, the term "substrate" is intended to include any material that is used to clean an article or a surface. Examples of cleaning substrates include, but are not limited to, wipes, mitts, pads, or a single sheet of material which is used to clean a surface by hand or a sheet of material which can be attached to a cleaning implement, such as a floor mop, handle, or a hand held cleaning tool, such as a toilet cleaning device. The term "substrate" is also intended to include any material that is used for personal cleansing applications. These substrates can be used for hard surface, soft surface, and personal care applications. Such substrates may typically be in the form of a wipe.

Such substrates may be formed of a structure of individual fibers which are interlaid, typically in a manner that is not identifiable (e.g., a nonwoven). The nonwoven substrates, or layers used to make up such a nonwoven substrate included in the present substrates may be formed by any suitable process. For example, they may be meltblown, spunbond, spunlaid, SMS (spunbond-meltblown-spunbond), coformed, carded webs, thermal bonded, thermoformed, spunlace, hydroentangled, hydroembossed, needled, or chemically bonded. Various processes for forming such nonwovens will be apparent to those of skill in the art, many of which are described in U.S. Pat. No. 7,696,109, incorporated herein by reference in its entirety. EP Applications EP992338, EP1687136, EP1861529, EP1303661, and US2004/0157524 are also herein incorporated by reference, each in its entirety. These references describe various nonwoven structures which are generally illustrative, and which may be modified by using biodegradable and/or compostable synthetic binder fibers rather than the synthetics typically employed in the prior art.

The terms "wipe", "substrate" and the like may thus overlap in meaning, and while "wipe" may typically be used herein for convenience, it will be appreciated that this term may often be interchangeable with "substrate".

As used herein, "wiping" refers to any shearing action that the wipe undergoes while in contact with a target surface. This includes hand or body motion, substrate-implement motion over a surface, or any perturbation of the substrate via energy sources such as ultrasound, mechanical vibration, electromagnetism, and so forth.

The cleaning compositions dosed onto the substrate as described herein may provide sanitization, disinfection, or sterilization, other cleaning, or other treatment. As used herein, the term "sanitize" shall mean the reduction of "target" contaminants in the inanimate environment to levels considered safe according to public health ordinance, or that reduces a "target" bacterial population by significant numbers where public health requirements have not been established. By way of example, an at least 99% reduction in bacterial population within a 24 hour time period is deemed "significant." Greater levels of reduction (e.g., 99.9%, 99.99%, etc.) are possible, as are faster treatment times (e.g., within 10 minutes, within 5 minutes, within 4 minutes, within 3 minutes, within 2 minutes, or within 1 minute), when sanitizing or disinfecting.

As used herein, the term "disinfect" shall mean the elimination of many or all "target" pathogenic microorganisms on surfaces with the exception of bacterial endospores.

As used herein, the term "sterilize" shall mean the complete elimination or destruction of all forms of "target" microbial life and which is authorized under the applicable regulatory laws to make legal claims as a "sterilant" or to have sterilizing properties or qualities.

Some embodiments may provide for at least a 2 or more log reduction (e.g., 3-log reduction, or 6-log reduction) in a bacterial population within a designated time period (e.g., 10 minutes, 5 minutes, 4 minutes, 3 minutes, 1 minute, 30 seconds, 10 seconds or the like). A 2-log reduction is equivalent to a 99% reduction, a 3-log reduction is equivalent to at least a 99.9% reduction, a 4-log reduction is equivalent to at least a 99.99% reduction, a 5-log reduction is equivalent to at least a 99.999% reduction, etc. An example of a target microbe may be *Staphylococcus aureus*. It will be appreciated that antimicrobial efficacy can also be achieved against other target microbes, numerous examples of which will be apparent to those of skill in the art.

As used herein, the term "cleaning composition", as used herein, is meant to mean and include a cleaning formulation having at least one surfactant.

As used herein, the term "surfactant", as used herein, is meant to mean and include a substance or compound that reduces surface tension when dissolved in water or water solutions, or that reduces interfacial tension between two liquids, or between a liquid and a solid. The term "surfactant" thus includes anionic, nonionic and/or amphoteric agents.

The term "Design for the Environment" or "DfE" means the U.S. EPA program that is focused on identifying safer sanitizing and disinfecting active ingredients. The EPA has a special approval process for products that met the DfE criteria. The EPA, as part of the DfE program has identified certain active ingredients that are approved for antimicrobial cleaning products and authorized to use the DfE logo. The antimicrobial cleaning products that have been approved under the DfE program may be found under https://www.epa.gov/pesticide-labesl/design-environment-logo-antimicrobial-pesticide-products#authorizeddfe. All products approved for DIE program must have ingredients that meet the "Safer Choice Standard" according to https://www.epa.gov/pesticide-labesl/design-environment-logo-antimicrobial-pesticide-products#approved and https://www.epa.gov/saferchoice/safer-choice-standard.

The term "food contact surface" means as defined by the EPA and/or FDA. For example, the FDA defines the term in its "Food Code" 1-201.10 as (1) a surface of equipment or a utensil with which food normally comes into contact; or (2) a surface of equipment or a utensil from which food may drain, drip, or splash (a) into a food, or (b) onto a surface normally in contact with food.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

Acid

In one aspect of the invention, the acidic cleaning composition comprises: a carboxylic acid or mixture of carboxylic acids. In one embodiment of the invention, there is only one carboxylic acid in the cleaning composition. In one embodiment of the invention, the acidic cleaning composition is free of lactic acid and/or glycolic acid. Suitable carboxylic acids include, but are not limited to: citric acid, caprylic acid and any mixtures or combinations thereof. The acid may also include an alkylsulfonic acid such as methanesulfonic acid. Suitable compositions comprise at least one acid in concentrations of 0.1 to 5% by weight, or 0.1 to 4% by weight, or 0.1 to 3% by weight, or 0.2 to 3% by weight, or 0.2 to 2% by weight, or 0.5 to 2% by weight, or 0.5 to 1% by weight. Concentrated formulations will yield these levels at use dilution.

Anionic Surfactants

In one aspect of the invention, the acidic cleaning composition contains an anionic surfactant. Inventive formulations that are designed for use as sprays or lotion loaded wipes on kitchen counters, other kitchen surfaces such as sinks, stovetops, refrigerator and microwave interiors and other food contact surfaces are typically free of surfactants containing ethylene oxide groups, in order to minimize amounts of 1,4 dioxane on these surfaces.

The anionic surfactant can be selected from one or more of: sulfates, sulfonates, sultaines and any salts or derivatives thereof. Suitable anionic surfactants include, but are not limited to: organosulfates including methylsulfates and sulfate esters. Suitable sulfonates include both sulfonate salts and sulfonic esters. Specific examples of suitable anionic surfactants include, but are not limited to: secondary alkane sulfonate (SAS), sodium laureth sulfate (SLS), sodium xylene sulfonate (SXS), sodium lauryl ether sulfate (SLES), ammonium lauryl sulfate (ALS), alkylbenzene sulfonates (LAS), sodium cumene sulfonate (SCS), sodium toluene sulfonate (STS), branched alkylbenzene sulfonates (BAS), and any mixtures or combinations thereof. In one embodiment, the anionic surfactant is selected from: alkyl sulfates, alkyl sulfonates including secondary alkyl sulfonates, and alkylbenzene sulfonates and any mixtures of combinations thereof. The anionic surfactant may be included in either a free acid or salt form. Suitable compositions comprise an anionic surfactant in an amount of from 0.01 to 3% by weight, 0.01 to 2% by weight, 0.1 to 1.5% by weight, 0.1 to 1% by weight, 0.2 to 1% by weight or 0.1 to 0.8% by weight.

Solvents

In one embodiment of the invention, the acidic cleaning composition comprises one or more organic solvents examples of which include: $C_{1-18}$ alkanols, $C_{1-18}$ diols, $C_{3-24}$ alkylene glycol ethers, polyalkylene glycols, short chain carboxylic acids, short chain esters, and any mixture or combinations thereof. Alkanols include, but are not limited to, methanol, ethanol, n-propanol, isopropanol, butanol, pentanol, hexanol, decanol and isomers thereof. In one embodiment of the invention, the alkanol is one or more non-aromatic water-immiscible alcohols containing 8 to about 18 carbons. Such $C_{8-18}$ alcohols are of low toxicity and some are recognized by the EPA as useful in formulations complying with the criteria of the Safer Choice program and/or as ingredients of use in food-contact sanitizer formulations. Without wishing to be bound by theory, the inventors believe that the membrane interaction of the alcohols is a stressor which complements the degradation of maintenance of cell membrane pH gradient caused by an acid such as citric acid. Preferably, the alcohols used in the invention are either not classified as volatile organic compounds (i.e., vapor pressure of 0.1 mm Hg or less), or the level of alcohol that is classified as a volatile organic compound is 3% or less, 2% or less, 1% or less, 0.5% or less, or less than 0.5%.

Diols include, but are not limited to, methylene, ethylene, propylene butylene, and hexylene glycols. Alkylene glycol ethers include, but are not limited to, ethylene glycol monopropyl ether, ethylene glycol monobutyl ether, ethylene glycol monohexyl ether, diethylene glycol monopropyl ether, diethylene glycol monobutyl ether, diethylene glycol monohexyl ether, propylene glycol methyl ether, propylene glycol ethyl ether, propylene glycol n-propyl ether, propylene glycol monobutyl ether, propylene glycol t-butyl ether, di- or tri-polypropylene glycol methyl or ethyl or propyl or butyl ether, acetate and propionate esters of glycol ethers. In one embodiment, the preferred solvents are those with vapor pressure below 0.1 mm Hg to minimize volatile organic compound content. Short chain esters include, but are not limited to, glycol acetate, and cyclic or linear volatile methylsiloxanes. In one embodiment, only glycol ether solvents containing only propylene oxide are included in the formula. In another embodiment, at least one of the glycol ether solvents is a non-aromatic glycol ether propoxylate (e.g tripropylene glycol n-butyl ether (DOWANOL TPnB)).

In one embodiment, the solvent is selected from: glycol ethers, alcohols, and any combinations or mixtures thereof. In one embodiment, the glycol ether solvents contain only propylene oxide (i.e., no ethylene oxide). In another embodiment, the only solvents in the acidic cleaning composition consist of one or more glycol ether solvents. In this embodiment, glycol ethers are the only organic solvent in the composition and the composition is free of any other solvents except water. Exemplary glycol ether solvents include, but are not limited to, ethylene glycol monopropyl ether, ethylene glycol monobutyl ether, ethylene glycol phenyl ether, ethylene glycol monohexyl ether, propylene glycol n-propyl ether, propylene glycol monobutyl ether, propylene glycol t-butyl ether, diethylene glycol monoethyl or monopropyl or monobutyl ether or monohexyl ether, di- or tri-polypropylene glycol methyl or ethyl or propyl or butyl ether, acetate and/or propionate esters of glycol ethers. Exemplary alcohol solvents include fatty alcohols selected from: methanol, isopropanol, ethanol, butanol, hexanol, heptanol, octanol, nonanol, decanol, dodecanol, and any mixtures or combinations thereof. In an embodiment, such a fatty alcohol is not a lower alcohol ($C_1$-$C_4$), but has at least 5 carbon atoms, at least 6 carbon atoms, or at least 7 carbon atoms.

In one embodiment of the invention, there is a two part solvent system that consists of: one or more glycol ether solvents and a fatty alcohol solvent. Suitable compositions comprise one or more solvents in an amount of 0.01 to 10% by weight, 0.01 to 5% by weight, 0.5 to 5% by weight, 1 to 5% by weight, 1 to 3% by weight or 0.5 to 3% by weight. In one embodiment, the fatty alcohol solvent is present in an amount of 0.01 to 2% by weight; 0.1 to 2% by weight; 0.2 to 1% by weight; or 0.1 to less than 1% by weight. In one embodiment, the one or more glycol ether solvents are present in an amount of 0.1 to 5% by weight; 0.1 to 3% by weight; 0.2 to 3% by weight; or 0.5 to less than 3% by weight. In one embodiment of the invention, the acidic cleaning composition comprises a mixture of at least two glycol ether solvents.

Alkyl Polyglucoside

In one embodiment, the acidic cleaning compositions contain alkyl polyglucoside surfactant. The alkyl polyglucoside surfactant preferably has a naturally derived alkyl substituent, such as coconut fatty alcohol. Suitable alkylpolyglycosides (or alkylpolyglucosides) have the formula: $R^2O(C_nH_{2n}O)_t(glucosyl)_x$ wherein $R^2$ is selected from the group consisting of alkyl, alkylphenyl, hydroxyalkyl, hydroxyalkylphenyl, and mixtures thereof in which the alkyl groups contain from about 6 to about 18, preferably from about 8 to about 16, carbon atoms; n is about 2 or about 3, preferably about 2; t is from 0 to about 10, preferably 0; and x is from about 1.3 to about 10, preferably from about 1.3 to about 3, most preferably from about 1.3 to about 2.7. The glucosyl is preferably derived from glucose. To prepare these compounds, the alcohol or alkylpolyethoxy alcohol is formed first and then reacted with glucose, or a source of glucose, to form the glucoside (attachment at the 1-position). The additional glucosyl units can then be attached between their 1-position and the preceding glucosyl units 2-, 3-, 4- and/or 6-position, preferably predominantly the 2-position.

A group of alkyl glycoside surfactants suitable for use in the practice of this invention may be represented by formula I below:

$$RO—(R^2O)_y-(G)_xZb$$

wherein R is a monovalent organic radical containing from about 6 to about 18 (preferably from about 8 to about 16) carbon atoms; $R^2$ is a divalent hydrocarbon radical containing from about 2 to about 4 carbon atoms; O is an oxygen atom; y is a number which has an average value from about 0 to about 1 and is preferably 0; G is a moiety derived from a reducing saccharide containing 5 or 6 carbon atoms; and x is a number having an average value from about 1 to 5 (preferably from 1.1 to 2); Z is $O_2M^1$, $O_2CR^3$, $O(CH_2)_p$, $CO_2M^1$, $OSO_3M^1$, or $O(CH_2)_pSO_3M^1$; $R^3$ is $(CH_2)_pCO_2M^1$ or $CH{=}CHCO_2M^1$; (with the proviso that Z can be $O_2M^1$ only if Z is in place of a primary hydroxyl group in which the primary hydroxyl-bearing carbon atom, $—CH_2OH$, is oxidized to form a $—CO_2M^1$ group); b is a number from 0 to 3x+1 preferably an average of from 0.5 to 2 per glucosal group; p is 1 to 10, $M^1$ is $H^+$ or an organic or inorganic cation, such as, for example, an alkali metal, ammonium, monoethanolamine, or calcium. As defined in Formula I, R is generally the residue of a fatty alcohol having from about 6 to 18 or 8 to 16 carbon atoms. Suitable alkylglycosides include, for example, APG 425® (a coconut alkyl polyglycoside having naturally derived components available from Cognis Corporation), APG 325® (a $C_9$-$C_{11}$ alkyl polyglycoside available from Cognis Corporation), APG 625® (a $C_{10}$-$C_{16}$ alkyl polyglycoside available from Cognis Corporation), Dow Triton® CG110 (a $C_8$-$C_{10}$ alkyl polyglycoside available from Dow Chemical Company), AG6202® (a $C_8$ alkyl polyglycoside available from Akzo Nobel) and Alkadet 15® (a $C_8$-$C_{10}$ alkyl polyglycoside available from Huntsman Corporation). A C8 to C10 alkylpolyglucoside includes alkylpolyglucosides wherein the alkyl group is substantially C8 alkyl, substantially C10 alkyl, or a mixture of substantially C8 and C10 alkyl. Suitably, the alkyl polyglycoside is present in the cleaning composition in an amount ranging from about 0.01 to about 30 weight percent, 0.1 to 30 weight percent, 10 to 30 weight percent, 1 to 5 weight percent, 2 to 5 weight percent, 0.5 to 5 weight percent, 0.5 to 4 weight percent, 0.5 to 3 weight percent, 0.5 to 2.0 weight percent, 0.1 to 0.5 weight percent, 0.1 to 1.0 weight percent, 0.1 to 2.0 weight percent, 0.1 to 3.0 weight percent, or 0.1 to 4.0 weight percent, or greater than 2 weight percent, or greater than 3 weight percent.

Water

When the composition is an aqueous composition, water can be a predominant ingredient. The water should be present at a level of more than 90 weight percent, or more than about 95 weight percent, or about 98 weight percent or more. Concentrated formulations may include significantly less if any water, but upon dilution for use, the water may be present in such values as noted above. Deionized or filtered water is preferred. Where the cleaning composition is concentrated, the water may be present in the composition at a concentration of less than about 85 wt. %.

Additional Adjuvants

The acidic cleaning composition may optionally include and/or be used in combination with one or more additional adjuncts. The adjuncts include, but are not limited to, fragrances or perfumes, waxes, dyes and/or colorants, solubilizing materials, stabilizers, thickeners, defoamers, hydrotropes, buffers, builders, lotions and/or mineral oils, cloud point modifiers, and/or preservatives. A variety of builder detergents can be used in and/or used in combination with the cleaning composition. Such builder detergents include, but are not limited to, phosphate-silicate compounds, zeolites, alkali metal, ammonium and substituted ammonium polyacetates, methylglycine diacetic acid and its salts, N,N-dicarboxymethyl glutamic acid and its salts, mono-, di-, and tri-alkali salts of nitrilotriacetic acid, carboxylates, aluminosilicate materials, silicates, polycarboxylates, polyitaconic acid, zeolites, carbonates, phosphates, bicarbonates, polyphosphates, amines, alkanolamines, aminopolycarboxylates, polyhydroxysulfonates, starch derivatives, ethylenediamine tetraacetate, and/or metal ion sequestrants (e.g., aminopolyphosphonates such as, but not limited to, ethylenediamine tetramethylene phosphonic acid and diethylene triamine pentamethylenephosphonic acid). In one embodiment, the builder is free of phosphorus compounds. In one embodiment, the builder is free of nitrilotriacetic acid and/or its salts. In one embodiment, the builder detergent includes polyacetate and/or polycarboxylate compounds. In one aspect of this embodiment, the polyacetate and/or polycarboxylate compounds include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, polyitaconic acid, acetic acid, and citric acid. In one embodiment, the buffering and pH adjusting agents, when used, include, but are not limited to, organic acids, mineral acids, alkali metal and alkaline earth salts of silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and/or 2-amino-2methylpropanol. The buffering agent can be an active detergent in its own right, and/or can be a low molecular weight, organic or inorganic material used for maintaining the desired pH. The buffer can be alkaline, acidic or neutral. Non-limiting examples of buffering agents include nitrogen-containing materials (e.g., lysine; lower alcohol amines like mono-, di-, and tri-ethanolamine; tri(hydroxymethyl) amino methane; 2-amino-2-ethyl-1,3-propanediol; 2-amino-2-methyl-propanol; 2-amino-2-methyl-1,3-propanol; disodium glutamate; methyl diethanolamide; 2-dimethylamino-2-methylpropanol; 1,3-bis(methylamine)-cyclohexane; 1,3-diamino-propanol N,N'-tetra-methyl-1,3-diamino-2-propanol; N,N-bis(2-hydroxyethyl)glycine; tris(hydroxymethyl)methyl glycine; ammonium carbamate; citric acid; acetic acid; ammonia; alkali metal carbonates; and/or alkali metal phosphates). For additional buffers that can be used, see McCutcheon's EMULSIFIERS AND DETERGENTS, North American Edition, 1997, McCutcheon Division, MC Publishing Company which is incorporated herein by reference. In yet another and/or alternative embodiment, the solubilizing materials, when used, include, but are not limited to; hydrotropes (e.g., $C_6$-$C_8$ alkylpolyglucosides and water soluble salts of low molecular weight organic acids such as the sodium and/or potassium salts of xylene sulfonic acid, cumene sulfonic acid, and toluene sulfonic acid). In another and/or alternative embodiment, the acids, when used, include, but are not limited to, organic hydroxy acids, citric acids, keto acid, and the like. In still another and/or alternative embodiment, thickeners, when used, include, but are not limited to, polyacrylic acid, xanthan gum, calcium carbonate, aluminum oxide, alginates, guar gum, methyl, ethyl, clays, and/or propylhydroxycelluloses. In yet another and/or alternative embodiment, defoamers, when used, include, but are not limited to, $C_8$-$C_{20}$ fatty acids, silicones, aminosilicones, silicone blends, and/or silicone/hydrocarbon blends. In still a further and/or alternative embodiment, preservatives, when used, include, but are not limited to, mildewstats or bacteriostats, methyl, ethyl and propyl parabens, bisguanidine compounds (e.g., Dantagard and/or Glydant) and/or short chain alcohols (e.g., ethanol and/or IPA). In one aspect of this embodiment, the mildewstats or bacteriostats include, but are not limited to, mildewstats (including non-isothiazolone compounds) include Kathon GC, a 5-chloro-2-methyl-4-isothiazolin-3-one, Kathon ICP, a 2-methyl-4-isothiazolin-3-one, and a blend thereof, and Kathon 886, a 5-chloro-2-methyl-4-isothiazolin-3-one, all available from Rohm and Haas Company; Bronopol, a 2-bromo-2-nitropropane-1,3-diol, from Boots Company Ltd.; Proxel CRL, a propyl-p-hydroxybenzoate, from ICI PLC; Nipasol M, an o-phenyl-phenol, Na+ salt, from Nipa Laboratories Ltd.; Dowicide A, a 1,2-Benzoisothiazolin-3-one, from Dow Chemical Co.; and Irgasan DP 200, a 2,4,4'-trichloro-2-hydroxydiphenylether, from Ciba-Geigy A.G. In one embodiment of the invention, the inventive composition is free from paraben compounds. In another embodiment of the invention, the inventive composition is free of isothiazolinone compounds. In a further embodiment of the invention, the inventive composition is free of preservatives.

In addition, the inventive compositions may contain one or more vitamins or vitamin precursors known to enhance antimicrobial performance Examples of these include retinal, retinol, tocopherols, ascorbic acid, and vitamins D, E and K.

The acidic cleaning compositions optionally contain dyes, colorants and preservatives, or contain one or more, or none of these components. These dyes, colorants and preservatives can be natural (occurring in nature or slightly processed from natural materials) or synthetic. Natural preservatives include benzyl alcohol, potassium sorbate and bisabalol; sodium benzoate and 2-phenoxyethanol. Preservatives, when used, include, but are not limited to, mildewstat or bacteriostat, methyl, ethyl and propyl parabens, bisguanidine compounds (e.g. Dantagard and/or Glydant). The mildewstat or bacteriostat includes, but is not limited to, mildewstats (including non-isothiazolone compounds) including Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, all available from Rohm and Haas Company; BRONOPOL, a 2-bromo-2-nitropropane 1, 3 diol, from Boots Company Ltd., PROXEL CRL, a propyl-p-hydroxybenzoate, from ICI PLC; NIPASOL M, an o-phenyl-phenol, $Na^+$ salt, from Nipa Laboratories Ltd., DOWICIDE A, a 1,2-Benzoisothiazolin-3-one, from Dow Chemical Co., and IRGASAN DP 200, a 2,4,4'-trichloro-2-hydroxydiphenylether, from Ciba-Geigy A.G. Dyes and colorants include synthetic dyes such as Liquitint® Yellow or Blue or natural plant dyes or pigments, such as a natural yellow, orange, red, and/or brown pigment, such as carotenoids, including, for example, beta-carotene and lycopene. One embodiment of the invention is free from paraben compounds. Another embodiment of the invention is free of isothiazolinone compounds. A further embodiment of the invention is free of preservatives.

In another embodiment of the invention, surfactants synthesized from amino acids and fatty acids may be included in the formulation. The alkyl amino acid esters, such as lauryl arginate ester, can be included to enhance microefficacy. Fatty acids may include $C_6$-$C_{22}$ fatty acids, linear or branched, aromatic or aliphatic; some representative amino acids may include, without restriction, glutamic acid, glycine, alanine, sarcosine, lysine, histidine, and arginine. For the formulations that include an amino acid surfactant, the active percentage by weight is about 0.0005% to 2.0%, or 0.01% to 1.0% or 0.02% to 0.5%. The exemplary Formulas A-D in Table I in the Examples section shows the use of lauryl arginate ester, made from lauric acid, arginine, and ethanol, in formulas containing citric acid.

Excluded Components

In one embodiment, the formulations of the present invention are free from oxidants such as peroxide, peracetic acid, hypochlorite, hypochlorous acid, hypohalites, and other similar oxidants. The inventive compositions may also be free of quaternary ammonium compounds, triclosan, triclocarban, iodine, and surfactants containing a fluorine atom. The inventive compositions may be free or substantially free of antimicrobial actives selected from: benzyl alcohol, phenols, chlorinated phenols, biguanides, bis-amines, thymol, metal nanoparticles, and any mixtures or combinations thereof. The inventive composition may be free from strong inorganic acids, including but not limited to, hydrochloric, nitric, sulfuric, and phosphoric acids. In one embodiment, the inventive composition may contain only one organic acid.

In another embodiment of the invention, certain alcohol and glycol ether solvents may be excluded from the acid cleaning composition. In this embodiment, the inventive compositions are free of or substantially free of water-miscible short chain (e.g., $C_1$-$C_4$) alcohols, such as methanol, ethanol, iso-propanol and the like. A small amount, about 0.1% by weight or less or 0.01% by weight or less, of these alcohols may be present if they are part of the optional fragrance. In another embodiment, the inventive compositions are free from glycol ether esters. In some acidic cleaning compositions the glycol ether esters may be detrimental to long term chemical stability of the composition. The inventive compositions may also be free of glycol ether solvents, such as DOWANOL PPH and DiPPH glycol ethers.

In another embodiment of the invention, the inventive acid cleaning composition is free from synthetic zwitterionic surfactants, such as cocoamidopropyl betaine. The inventive acidic cleaning composition may also be free from: aromatic disulfonates (e.g. alkyl phenoxy disulfonates such as DOWFAX materials) and alkyl naphthalene sulfonates and alkyl phenol ethoxylates amine oxides and inorganic phosphate salts.

pH

The pH of the cleaning composition is measured directly as ready to use, without further dilution. The cleaning compositions can have a pH of from 1.5 to 6, from 2 to 5, from 2.5 to 3.5, or from 2 to 3.5.

Antimicrobial Compounds, Disinfectants and Sanitizers

The acidic cleaning compositions contain an acid, but are free of, or contain substantially no, additional disinfectants or sanitizers, such as quaternary ammonium antimicrobials, biguanides, peroxides or hypochlorite compounds. Although the compositions may contain minor amounts (e.g. less than 0.5% or less than 0.2% or less than 0.1%) of traditional antimicrobials as preservatives or buffers, the compositions are without the use of traditional quaternary ammonium compounds. Non-limiting examples of these quaternary compounds include benzalkonium chlorides and/or substituted benzalkonium chlorides, di($C_6$-$C_{14}$)alkyl di short chain ($C_{1-4}$ alkyl and/or hydroxyalkl) quaternaryammonium salts, N-(3-chloroallyl) hexaminium chlorides, benzethonium chloride, methylbenzethonium chloride, and cetylpyridinium chloride. Other quaternary compounds include the dialkyldimethyl ammonium chlorides, alkyl dimethylbenzylammonium chlorides, dialkylmethyl-enzylmmonium chlorides, and mixtures thereof. Biguanide antimicrobial actives including, but not limited to polyhexamethylene biguanide hydrochloride, p-chloro-henyl biguanide; 4-chlorobenzhydryl biguanide, halogenated hexidine such as, but not limited to, chlorhexidine (1,1'-hexamethylene-bis-5-(4-chlorophenyl biguanide) and its salts are also in this class.

Associative Polyelectrolye Complexes

The associative polyelectrolyte complexes (PECs) that can be included in the present invention have been found to exhibit surprisingly rapid adsorption onto a wide variety of surfaces, even in the presence of other surface-active agents commonly employed in cleaning and treatment formulations. The adsorption of the associative PECs proceeds, even in the presence of other surface-active agents. Specific, non-limiting examples of these PECs formulations are disclosed in U.S. Pat. Nos., to Scheuing et al., U.S. Pat. Nos. 9,474,269, 9,796,872, 9,273,220, 9,012,389, 8,993,505, 9,796,872, 9,593,299, 9,809,790, 9,663,747, 9,486,800, 9,309,435, 9,976,109, 10,400,131, 10,208,275, 10,563,156 and 10,066,196, each of which is incorporated herein by reference in its entirety.

The associative PECs comprise at least two different water-soluble polyelectrolytes, each of which bears electrostatically charged groups, or groups capable of developing a charge (capable of ionization), in which the overall net charges on the two polymers are opposite or are capable of becoming opposite. The presence of PECs and their dimensions in aqueous solutions may be characterized via static or dynamic light scattering (DLS). It is well known to those skilled in the art that light scattering analyses need to be conducted with an optimum concentration of scattering particles (PECs, for example). The concentration of polyelectrolytes in many of the PEC precursor solutions is often too high for meaningful DLS analyses. However, dilution of the PEC precursor solution to form the PECs of interest usually results in solutions which are amenable to analysis by DLS, and hence examples below will demonstrate that stable PECs (generally, having diameters less than 500, preferably less than 200, and more preferably less than 100 nm) are formed upon dilution of the precursor solutions. The diameters of the PECs (in nanometers) and their zeta potentials were measured with a Zetasizer ZS (Malvern Instruments). This instrument employs DLS, also known as Photon Correlation spectroscopy, to determine the diameters of colloidal particles in the range from about 0.1 nm to about 10000 nm.

The Zetasizer ZS instrument offers a range of default parameters which can be used in the calculation of particle diameters from the raw data (known as the correlation function or autocorrelation function). The diameters of the PECs reported herein were determined using a simple calculation model, in which the optical properties of the PECs were assumed to be similar to spherical particles of polystyrene latex particles, a common calibration standard used for more complex DLS experiments. In addition, the software package supplied with the Zetasizer provides automated analysis of the quality of the measurements made, in the form of "Expert Advice". The diameters described herein (specifically what is known as the "Z" average particle diameter) were calculated from raw data that met "Expert Advice" standards consistent with acceptable results, unless otherwise noted. In other words, the simplest set of default measurement conditions and calculation parameters were used to calculate the diameters of all of the PECs described herein, in order to facilitate direct comparison of PECs based on a variety of polymers, and avoiding the use of complex models of the scattering which could complicate or prevent comparisons of the diameters of PECs of differing chemical composition. Those skilled in the art will appreciate the particularly simple approach taken here, and realize that it is a valid approach to comparing and characterizing the PECs.

The Zetasizer ZS instrument instrument calculates the zeta potential of colloidal particles from measurements of the electrophoretic mobility, determined via a Doppler laser velocity measurement. The relationship between the electrophoretic mobility (a measurement of the velocity of a charged colloidal particle moving in an electric field) and the zeta potential (electric charge, expressed in units of millivolts) is well known. As in the particle size measurements, to facilitate direct comparison of PECs based on a variety of polymers, the simplest set of default measurement conditions were used. In other words, the aggregates were assumed to behave as polystyrene latex particles, and the Smoluchowski model relating the electrophoretic mobility and the zeta potential was used in all calculations. Unless otherwise noted, the mean zeta potentials described herein were calculated from raw data that met "Expert Advice" standards consistent with acceptable results. PECs bearing a net cationic (positive) charge will exhibit positive values of the zeta potential (in mV), while those bearing a net anionic (negative) charge will exhibit negative values of the zeta potential (in mV).

In the initial absence of any charged surfactants and/or surface active adjuncts, it has been discovered that stable associative PECs may be produced by the blending of aqueous stock solutions of the oppositely charged polymers such that the total polymer concentration in the mixture is less than 100 mM, preferably less than 75 mM, more preferably less than 50 mM, and most preferably less than 10 mM, and further providing that a specific mixing order as described herein below is followed in the preparation of the associative PECs Natural Cationic Polymers Any natural cationic polymer may be employed to form associative polyelectrolyte complexes (PECs). Chitosan is a preferred natural polymer, but also acceptable in addition to the natural polysaccharide obtained by deacetylation of chitin (from marine source) or by direct isolation from fungi, are those synthetically produced β-1,4-poly-D-glucosamines and derivatives thereof that are isomers or structurally similar to natural chitosan. The chitosan polymers of the invention can have substantially protonated glucosamine monomeric units, improving polymer water solubility, for example, N-hydroxybutyl chitosans described in U.S. Pat. No. 4,931,271 to Lang et al. and chitosan pyrithione derivatives described in U.S. Pat. No. 4,957,908 to Nelson. Additional polysaccharides suitable for use in the composition according to the invention include, but are not limited to, cationic guar, hydroxypropyl guar and starch bearing cationic charges added by chemical quaternization (for example, but not limited to, alkoxylation with a quaternary epoxide).

When present the natural cationic polymer level in the compositions of the present invention is typically from about 0.001 wt % to about 5.0 wt %, or from about 0.01 wt % to about 2.5 wt %, or from about 0.01 wt % to about 1.0 wt %, or from about 0.1 wt % to about 0.50 wt %.

Synthetic Cationic Polymers

Suitable cationic polymers, for the formation of PECs, include homopolymers or copolymers of monomers having a permanent cationic charge or monomers capable of forming a cationic charge in solution upon protonation. Examples of permanently cationic monomers include, but are not limited to, diallyl dimethyl ammonium salts (such as the chloride salt, referred to herein as DADMAC) quaternary ammonium salts of substituted acrylamide, methacrylamide, acrylate and methacrylate, such as trimethylammoniumethyl methacrylate, trimethylammoniumpropyl methacrylamide, trimethylammoniumethyl methacrylate, trimethylammoniumpropyl acrylamide, 2-vinyl N-alkyl quaternary pyridinium, 4-vinyl N-alkyl quaternary pyridinium, 4-vinylbenzyltrialkylammonium, 2-vinyl piperidinium, 4-vinyl piperidinium, 3-alkyl 1-vinyl imidazolium, and the ionene class of internal cationic monomers as described by D. R. Berger in Cationic Surfactants, Organic Chemistry, edited by J. M. Richmond, Marcel Dekker, New York, 1990, ISBN 0-8247-8381-6, which is incorporated herein by reference. The counterion of the cationic co-monomer can be selected from, for example, chloride, bromide, iodide, hydroxide, phosphate, sulfate, hydrosulfate, ethyl sulfate, methyl sulfate, formate, and acetate.

Examples of monomers that are cationic on protonation include, but are not limited to, acrylamide, N,N-dimethylacrylamide, N,N di-isopropylacryalmide, N-vinylimidazole, N-vinylpyrrolidone, vinyl pyridine N-oxide, ethyleneimine, dimethylaminohydroxypropyl diethylenetriamine, dimethylaminoethyl methacrylate, dimethylaminopropyl methacrylamide, dimethylaminoethyl acrylate, dimethylaminopropyl acrylamide, 2-vinyl pyridine, 4-vinyl pyridine, 2-vinyl piperidine, 4-vinylpiperidine, vinyl amine, diallylamine, methyldiallylamine, vinyl oxazolidone; vinyl methyoxazolidone, and vinyl caprolactam.

Monomers that are cationic on protonation typically contain a positive charge over a portion of the pH range of 2-11. Such suitable monomers are also presented in Water-Soluble Synthetic Polymers: Properties and Behavior, Volume II, by P. Molyneux, CRC Press, Boca Raton, 1983, ISBN 0-8493-6136. Additional monomers can be found in the International Cosmetic Ingredient Dictionary, 5th Edition, edited by J. A. Wenninger and G. N. McEwen, The Cosmetic, Toiletry, and Fragrance Association, Washington D.C., 1993, ISBN 1-882621-06-9. A third source of such monomers can be found in Encyclopedia of Polymers and Thickeners for Cosmetics, by R. Y. Lochhead and W. R. Fron, Cosmetics & Toiletries, vol. 108, May 1993, pp 95-135. All three references are hereby incorporated herein in their entirety.

Cationic polymers may also include other monomers, for example monomers having an uncharged hydrophilic or hydrophobic group. Suitable copolymers contain acrylamide, methacrylamide and substituted acrylamides and methacrylamides, acrylic and methacrylic acid and esters thereof. Suitable synthetic methods for these copolymers are described, for example, in Kirk-Othmer, Encyclopedia of Chemical Technology, Volume 1, Fourth Ed., John Wiley & Sons.

If PECs are included, the cationic polymer level in the compositions of the present invention is typically from about 0.001 wt % to about 5.0 wt %, or from about 0.01 wt % to about 2.5 wt %, or from about 0.01 wt % to about 1.0 wt %, or from about 0.1 wt % to about 0.50 wt %.

Anionic Polymers

Suitable anionic polymers for the formation of PECs include, but are not limited to, polycarboxylate polymers and copolymers of acrylic acid and maleic anhydride or alkali metal salts thereof, such as the sodium and potassium salts. Suitable are copolymers of acrylic acid or methacrylic acid with vinyl ethers, such as, for example, vinyl methyl ether, vinyl esters, ethylene, propylene and styrene. Also suitable are polymers containing monomers capable of taking on an anionic charge in aqueous solutions when dissolved in water that has been adjusted to an appropriate pH using an acid, a base, a buffer or combination thereof. Examples include, but are not limited to, acrylic acid, maleic acid, methacrylic acid, ethacrylic acid, dimethylacrylic acid, maleic anhydride, succinic anhydride, vinylsulfonate, cyanoacrylic acid, methylenemalonic acid, vinylacetic acid, allylacetic acid, ethylidineacetic acid, propylidineacetic acid, crotonic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, citraconic acid, vinylbenzoic acid, N-vinylsuccinamidic acid, mesaconic acid, methacroylalanine, acryloylhydroxyglycine, sulfoethyl methacrylate, sulfopropyl acrylate, and sulfoethyl acrylate. Suitable acid monomers also include styrenesulfonic acid, acrylamide methyl propane sulfonic acid, 2-methacryloyloxy-methane-1-sulfonic acid, 3-methacryloyloxy-propane-1-sulfonic acid, 3-(vinyloxy)-propane-1-sulfonic acid, ethylenesulfonic acid, vinyl sulfuric acid, 4-vinylphenyl sulfuric acid, ethylene phosphonic acid and vinyl phosphoric acid. Examples of commercially available products are Sokalan CP5® and PA30® from BASF, Alcosperse 175® or 177® from Alco and LMW 45N® and SPO2N® from Norsohaas. Also suitable are natural anionic polymers, including but not limited to saccharinic gums such as alginates, xanthates, pectins, carrageenans, guar, carboxymethyl cellulose, and scleroglucans.

If PECs are included, the anionic polymer level in the compositions of the present invention is typically from about 0.001 wt % to about 5.0 wt %, or from about 0.01 wt % to about 2.5 wt %, or from about 0.01 wt % to about 1.0 wt %, or from about 0.1 wt % to about 0.50 wt %.

Cleaning Substrate

The cleaning composition, when used to clean hard surfaces, may be used in conjunction with one or more absorbent and/or adsorbent materials. The cleaning composition can be sprayed and/or poured or squirted onto a hard surface to be cleaned and an absorbent and/or adsorbent material such as, but not limited to, a sponge, mop head, cloth, towel, and the like is then used to spread the cleaning composition on the hard surface and/or clean the hard surface. Additionally or alternatively, the cleaning composition is at least partially loaded on the absorbent and/or adsorbent material prior to the absorbent and/or adsorbent material at least partially applying the cleaning composition onto the hard surface and/or cleaning the hard surface.

The present invention also contemplates the pre-loading of the cleaning composition on a cleaning pad and/or cleaning wipe. In one embodiment, the cleaning wipe includes, but is not limited to, a woven and/or a nonwoven material. In one aspect of this embodiment, the nonwoven material includes, but is not limited to, nonwoven, fibrous sheet materials. In another and/or alternative aspect of this embodiment, the nonwoven material includes, but is not limited to, meltblown, coform, air-laid, spun bond, wet laid, bonded-carded web materials, and/or hydroentangled (also known as spunlaced) materials. In still another and/or alternative aspect of this embodiment, the woven material includes, but is not limited to, cotton fibers, cotton/nylon blends and/or other textiles. The fibers may be staple fibers, filaments, microfilaments, and any combination thereof. In another and/or alternative embodiment, the cleaning wipe includes a sponge and/or sponge-like material. In one aspect of this embodiment, the sponge and/or sponge-like material includes, but is not limited to, regenerated cellulose and/or polyurethane foams. In still another and/or alternative embodiment, the cleaning wipe includes, but is not limited to, wood pulp, a blend of wood pulp, and/or synthetic fibers. In one aspect of this embodiment, the synthetic fibers include, but are not limited to, polyester, rayon, nylon, polypropylene, polyethylene, and/or cellulose polymers. In still another and/or alternative embodiment, the cleaning wipe includes a binder. The cleaning pad or cleaning wipe may be a multi-layered structure with different materials. For example the cleaning pad may include layers of non-woven material, woven materials, microfiber materials, sponge layers, foam layers, abrasive materials, etc.

The cleaning composition on the cleaning pad or cleaning wipe is typically in a ready to use liquid form; however, the cleaning composition can be in a concentrate in liquid, semi-liquid or solid form on the cleaning pad or cleaning wipe. Typically, the cleaning wipe has at least one layer of nonwoven material. The cleaning pad can also include one or more layers of nonwoven material.

Manufacturers of cleaning wipes that can be used in the present invention include, but are not limited to, Suominen, PGI, Kimberly-Clark, E.I. Du Pont de Nemours and Company, Dexter, American Nonwovens, and James River, BBA Nonwoven. Specific, non-limiting examples of cleaning wipes from these manufacturers are disclosed in Bouchette et al., U.S. Pat. Nos. 4,781,974 and 4,615,937; Clark et al, U.S. Pat. No. 4,666,621; Amundson et al., WO 98/03713; Cabell et al., U.S. Pat. No. 5,908,707; Mackey et al., WO 97/40814; Mackey et al., WO 96/14835; and Moore, EP 750063, all of which are incorporated herein by reference.

The cleaning pad typically has an absorbent capacity, when measured under a confining pressure of 0.09 psi after 20 minutes, of at least about 1 g deionized water per g of the cleaning pad. The cleaning pad will also typically have a total fluid capacity (of deionized water) of at least about 100 g. However, the absorbency and/or fluid capacity of the cleaning pad can vary depending on the desired use of the cleaning pad. The cleaning wipe can have the same or different amount of absorbency.

The loading ratio of the cleaning composition onto the cleaning wipe or cleaning pad can be about 2-5:1, and typically about 3-4:1; however, other loading ratios can be used. In a further and/or alternative embodiment, the liquid loading capacity of the cleaning wipe or pad is sufficient to retain the desired amount of cleaning composition on the cleaning wipe or pad. In one aspect of this embodiment, the liquid loading capacity of the cleaning wipe or pad is at least about 10% of the dry weight of the cleaning wipe or pad. In another and/or alternative aspect of this embodiment, the liquid loading capacity of the cleaning wipe or pad is about 50%-1000% of the dry weight of the cleaning wipe or pad. This loading capacity is expressed as loading ½ to 10 times the weight (or, more accurately, the mass) of the dry cleaning wipe or pad. In still another and/or alternative aspect of this embodiment, the liquid loading capacity of the cleaning wipe or pad is about 200%-800% of the dry weight of the cleaning wipe or pad. In yet another and/or alternative aspect of this embodiment, the liquid loading capacity of the cleaning wipe or pad is about 250%-500% of the dry weight of the cleaning wipe or pad. In still yet another and/or alternative aspect of this embodiment, the liquid loading capacity of the cleaning wipe or pad is about 300%-450% of the dry weight of the cleaning wipe or pad. In still a further and/or alternative embodiment, the cleaning composition is impregnated, dosed, loaded, metered, and/or otherwise dispensed onto the cleaning wipe or pad. The loading of the cleaning wipe or pad can be accomplished in several ways including, but not limited to, treating each individual wipe or pad with a discrete amount of cleaning composition, mass treating a continuous web of cleaning wipes with the cleaning composition, soaking the entire web of cleaning wipes in the cleaning composition, spraying the cleaning composition in a stationary or moving web of cleaning wipes, and/or impregnating a stack of individually cut and sized cleaning wipes or pad in a container and/or a dispenser. In another and/or alternative embodiment, the cleaning wipe or pad has a wet tensile strength of at least about 25-250 Newton/m. In one aspect of this embodiment, the cleaning wipe or pad has a wet tensile strength of about 25-250 Newton/m. In another and/or alternative aspect of this embodiment, the cleaning wipe or pad has a wet tensile strength of about 75-170 Newton/m. Such values may be for the machine direction, the cross-direction, or both. The cleaning composition can be loaded onto the cleaning wipe and/or cleaning pad in any number of manufacturing methods. Typically, the cleaning wipe or cleaning pad is sprayed with or soaked in the cleaning composition for a period of time until the desired amount of loading is achieved.

The cleaning pad or cleaning wipe can also be part of a cleaning kit or tool. The cleaning pad or cleaning wipe can also have an attachment layer that allows the cleaning pad or cleaning wipe to be connected to and/or disconnected from an implement's handle or the support head or an implement (e.g., mop, broom, etc.). The attachment layer can also function to prevent fluid flow through the top surface (e.g., the handle-contacting surface) of the cleaning pad or cleaning wipe, and/or can further provide enhanced integrity for the cleaning pad or cleaning wipe. The kit can have an assembly of one or more units, either packaged together or separately. The kit can comprise an implement containing a cleaning pad or cleaning wipe that may or may not include a superabsorbent material, and the cleaning composition. The cleaning pad or cleaning wipe can be detachably mounted on the implement so that the cleaning pad or cleaning wipe can be removed and/or replaced with a fresh clean pad or cleaning wipe. The implement can also have a reservoir that contains the cleaning composition. The reservoir can be refillable or contain a non-refillable amount of cleaning composition. The reservoir can also be detachably mounted on the implement to allow for easy refilling or replacing with a filled reservoir.

In still a further and/or alternative embodiment of the present invention, the cleaning wipes and/or pads can have an attachment layer that allows the wipe and/or pad to be connected to an implement's handle or the support head of various implements. The attachment layer is used in those embodiments where the absorbent and/or adsorbent layer is not suitable for attaching the wipe and/or pad to the support head of the handle. The attachment layer can also function as a mechanism to inhibit or prevent fluid flow through the top surface (e.g., the handle-contacting surface) of the cleaning wipe and/or pad, and/or can provide enhanced integrity of the wipe and/or pad. In one aspect of this embodiment, the attachment layer can consist of a mono-layer or a multi-layer structure. In another and/or alternative aspect of this embodiment, the attachment layer can comprise a surface which is capable of being mechanically attached to the handle's support head by use of a hook and loop system. In one specific design, the attachment layer can comprise at least one surface which is mechanically attachable to hooks that are affixed to the bottom surface of the handle's support head.

In another and/or alternative aspect of the present invention, the cleaning wipe or pad can be individually sealed with a heat-sealable and/or glueable thermoplastic overwrap such as, but not limited to, polyethylene, Mylar and the like. In one embodiment, the cleaning wipes or pads are packaged as numerous, individual sheets or pads which are at least partially, impregnated with the cleaning composition of the present invention. In another and/or alternative embodiment, the cleaning wipes are at least partially formed as a continuous web during the manufacturing process and loaded into a dispenser such as, but not limited to, a canister with a closure or a tub with closure. The closure is at least partially used to seal the loaded cleaning wipes from the external environment and/or prevent premature volatilization of the components of the cleaning composition. In one aspect of this embodiment, the dispenser includes a plastic such as, but not limited to, high density polyethylene, polypropylene, polycarbonate, polyethylene terephthalate (PET), polyvinyl chloride (PVC), and/or other rigid plastic. In another aspect and/or alternative of this embodiment, the continuous web of cleaning wipes is at least partially threaded through an opening in the top of the dispenser. In still another and/or alternative aspect of this embodiment, the dispenser includes a severing arrangement to cut at least a portion of the cleaning wipe after being at least partially removed from the dispenser. The severing arrangement can include, but is not limited to, a knife blade, serrated edge, and/or the like. In still yet another and/or alternative aspect of this embodiment, the continuous web of cleaning wipes can be scored, folded, segmented, and/or partially cut into uniform and/or non-uniform sizes, and/or lengths. In a further and/or alternative aspect of this embodiment, the cleaning wipes can be interleafed so that the removal of one cleaning wipes advances the next in the opening of the dispenser. The cleaning composition is generally not impregnated in a cleaning substrate. Because of the limited number of ingredients, these compositions tend to perform better when used with a substrate at the time of application or use, and not sold as a pre-wetted substrate. Examples of suitable substrates include, nonwoven substrates, woven substrates, hydroentangled substrates, foams and sponges and similar materials which can be used alone or attached to a cleaning implement, such as a floor mop, handle, or a hand held cleaning tool, such as a toilet cleaning device. The terms "nonwoven" or "nonwoven web" means a web having a structure of individual fibers or threads which are interlaid, but not in an identifiable manner as in a knitted web.

EXAMPLES

The acidic cleaning compositions are high performance cleaning formulations with a low toxicity profile, good cleaning performance and sanitization or disinfection efficacy. Table I below illustrates acidic cleaning compositions that can be loaded onto a substrate. Unlike some of the prior art acidic cleaning compositions, the inventive compositions in Table I have less than 5% citric acid by weight, or less than 1% citric acid by weight and there are no other acids or antimicrobial constituents in the inventive compositions. By way of example, at least some of the formulas of Table I were tested and found capable of providing at least a 2 or more log reduction (e.g., 3-log reduction, or 6-log reduction) in a bacterial population within a designated time period (e.g., 10 minutes, 5 minutes, 4 minutes, 3 minutes, 2 minutes, or the like). For example, Formula A of Table I was tested for efficacy on *Staphylococcus aureus* at a contact time of 10 minutes, 5 minutes and 2 minutes. The testing for antimicrobial efficacy on *Staphylococcus aureus* was performed according to the Standard Operating Procedure for Disinfectant Towelette Test: Testing of *Staphylococcus aureus, Pseudomonas aeruginosa* and *Salmonella enterica*" provided by the EPA under SOP Number MB-09-07, revised on Mar. 4, 2019. The EPA SOP MB-09-07 testing procedures are hereby incorporated by reference in their entirety. One or more of the Table I compositions were also tested according to the OECD 492 Guideline for the Testing of Chemicals, entitled "Reconstructed human Cornea-like Epithelium (RhCE) test method for identifying Chemicals not Requiring Classification and Labeling for Eye Irrigation or Serious Eye Damage" adopted on Jul. 28, 2015. The OECD 492 testing guidelines are hereby incorporated by reference in their entirety. According to the OECD 492 test, the exemplary formula in Table II qualifies as having a low eye toxicity classification referred to as UN GHS No Category.

Formula A of Table I includes addition of LAE (0.1%) plus APG (1.0%) and enables the use of citric acid levels as low at 0.1% with complete kill in suspension test in 10 minutes. By comparison, 0.1% citric acid alone gives little or no kill at 10 minutes.

Formula B of Table I includes addition of LAE plus APG, which boosts efficacy for a wipes application over 1.0% citric acid alone.

Formula C of Table I lowered the LAE level to 0.025%, and this formula exhibited reduced antimicrobial activity compared to 0.1%. LAE is a costly component.

Formula D of Table I included addition of PECs (the poly DADMAC and polyacrylic acid), which can improve antimicrobial performance when LAE is used at very low levels.

TABLE I

| Ingredient | Formula A Active in Product by wt. % | Formula B Active in Product by wt. % | Formula C Active in Product by wt. % | Formula D Active in Product by wt. % |
|---|---|---|---|---|
| Water | To 100% | To 100% | To 100% | To 100% |
| Lauryl Arginate Ester | 0.1% | 0.1% | 0.025% | 0.025% |
| Citric Acid | 0.1% | 1.0% | 0.1% | 1.0% |
| APG 325 | 1.0% | 1.0% | 1.0% | 1.0% |
| Poly DADMAC | 0% | 0% | 0% | 0.052% |
| Polyacrylic acid | 0% | 0% | 0% | 0.006% |

TABLE II

| Item | Trade Name | INCI Name | CAS No. | Active in Product by wt. % |
|---|---|---|---|---|
| 1 | EDR Water | Water | 7732-18-5 | Balance |
| 2 | Liquinat L50 | Citric acid | 77-92-9 | 0.4-1.0% |
| 3 | WeylClean SAS 30 | Secondary Alkane Sulfonate Sodium Salt | 68608-26-4 | 0.1-1.0% |
| 4 | Hexyl Cellosolve | Ethylene glycol monohexyl ether | 112-25-4 | 1.0-3.0% |
| 5 | Dowanol Eph | Ethylene glycol phenyl ether | 122-99-6 | 0.5-1.0% |
| 6 | Mascol 10/98 | 1-Decanol | 112-30-1 | 0.01-0.5% |
| 7 | Frag Fresh Daughter Mod 915358 or Frag Lemon Twist 491010 | Fragrance | NA | 0.01-0.2% |
| 8 | Floquat 4520 | Poly(Dimethyl Diallyl Ammonium Chloride) | 26062-79-3 | 0.01-0.1% |
| 9 | Aquatreat AR 4 | Polyacrylic acid | 9003-01-4 | 0.001-0.05% |
| 10 | Xiameter AFE-1410 | Silicone | 2035064-87-8 | 0.001-0.10% |
| | | Total | 100% | 100% |

The acidic cleaning compositions shown in Table III demonstrate the impact on antimicrobial efficacy of adding an amine oxide. Examples 1, 2 and 3 show significantly better antimicrobial efficacy performance than Example 4. The performance of Example 4 shows that adding more than a small amount of amine oxide does not provide any benefit to antimicrobial efficacy and may be negatively impacting antimicrobial efficacy results. In one embodiment of the invention, the acidic cleaning composition does not have any amine oxide surfactants. The only surfactants in this embodiment of the invention may be anionic surfactants selected from the group consisting of: sulfates, sulfonates, sultaines and mixtures thereof. As sulfate surfactants may hydrolyze, an embodiment may include only sulfonate and/or sultaine surfactants. The inventive acidic cleaning composition may be free of all nonionic, cationic and amphoteric surfactants.

TABLE III

| INCI Name | Ex. 1 Active in Product by wt. % | Ex. 2 Active in Product by wt. % | Ex. 3 Active in Product by wt. % | Ex. 4 Active in Product by wt. % |
|---|---|---|---|---|
| Water | Balance | Balance | Balance | Balance |
| Citric acid | 0.6% | 0.6% | 0.6% | 0.6% |
| Methanesulfonic acid | 0.1% | 0 | 0 | 0.1% |
| Linear alkylbenzene sulfonic acid | 0.45% | 0.45% | 0.44% | 0 |
| Dodecyldimethyl amine oxide | 0 | 0 | 0.02% | 0.45% |
| Ethylene glycol monohexyl ether | 1.3% | 1.3% | 1.3% | 1.3% |
| Ethylene glycol phenyl ether | 1.0% | 1.0% | 1.0% | 1.0% |
| Fragrance | 0.1% | 0.1% | 0.1% | 0.1% |
| Antimicrobial efficacy, *S. Aureus*, 1:30 min. contact time with soil (# positive carriers out of 60 tested) | 8 | 6 | 7 | 47 |

The acidic cleaning compositions shown in Table IV demonstrate the impact on antimicrobial efficacy of adding PECs. Examples 6 and 7 show better antimicrobial efficacy performance than Example 5. The performance of Example 5 shows that adding the PolyDADMAC and polyacrylic acid appear to provide a benefit to antimicrobial efficacy. In addition the higher levels of sulfonate surfactant in Examples 6 and 7 also appear to help improve antimicrobial efficacy results. The R values shown in Table IV for the PECs are a ratio of PolyDADMAC to poly(acrylic acid) at a total polymer concentration of 4 mM. In other embodiments of the invention, the R value will be the ratio of the cationic polymer to anionic polymer which are both included for forming PECs.

TABLE IV

| INCI Name | Example 5 Active in Product by wt. % | Example 6 Active in Product by wt. % | Example 7 Active in Product by wt. % |
|---|---|---|---|
| Water | Balance | Balance | Balance |
| Citric acid | 0.6% | 0.6% | 0.6% |
| Methanesulfonic acid | 0.1% | 0.1% | 0.1% |
| Secondary alkane sulfonate | 0.6% | 0.45% | 0.45% |
| Ethylene glycol monohexyl ether | 1.3% | 1.3% | 1.3% |
| Ethylene glycol phenyl ether | 1.0% | 1.0% | 1.0% |
| PolyDADMAC + polyacrylic acid | 0 | R = 0.5, 4 mM | R = 4, 4 mM |
| Fragrance | 0.1% | 0.1% | 0.1% |
| Antimicrobial efficacy, *S. Aureus*, 1:30 min. contact time with soil (# positive carriers out of 60 tested) | 2 | 1 | 1 |

The acidic cleaning compositions shown in Table V demonstrate the impact on antimicrobial efficacy of adding alkylpolyglucoside surfactant. Examples 8 and 9 show significantly worse antimicrobial efficacy performance than Example 10. The performance of Example 10 shows that adding alkylpolyglucoside in this formulation did not provide any benefit to antimicrobial efficacy and may be negatively impacting antimicrobial efficacy results in these exemplary formulations. In one embodiment of the invention, the acidic cleaning composition does not have any nonionic surfactants. Specifically, in some embodiments of the invention the inventive composition may be free of alkylpolyglucoside surfactants. In one embodiment of the invention, the composition only contains anionic surfactants selected from the group consisting of: sulfates, sulfonates, sulatines and mixtures thereof. In this embodiment, the inventive acidic cleaning composition may be free of all nonionic, cationic and amphoteric surfactants.

TABLE V

| INCI Name | Example 8 Active in Product by wt. % | Example 9 Active in Product by wt. % | Example 10 Active in Product by wt. % |
|---|---|---|---|
| Water | Balance | Balance | Balance |
| Citric acid | 0.6% | 0.6% | 0.6% |
| Methanesulfonic acid | 0.23% | 0.08% | 0.10% |
| Sodium lauryl sulfate | 0.01% | 0.28% | 0.44% |
| Dodecyldimethyl amine oxide | 0.34% | 0.03% | 0.02% |
| Alkylpolyglucoside | 0.3% | 0.3% | 0 |
| Ethylene glycol monohexyl ether | 1.8% | 1.8% | 1.5% |
| Fragrance | 0.1% | 0.1% | 0.1% |
| Antimicrobial efficacy, *S. Aureus*, 9:00 min. contact time without soil (# positive carriers out of 60 tested) | 39 | 29 | 19 |

The acidic cleaning compositions shown in Table VI demonstrate the impact of having higher levels (e.g. greater than 2% by wt.) of glycol ethers on eye toxicity. The greater the time reported for eye toxicity the better the performance of the example formulation in the eye toxicity test. Examples 12 and 13 have better eye toxicity results than Example 11. Furthermore, the addition of decanol as a solvent in Examples 15 and 16 show an even better performance on eye toxicity than the other exemplary formulations in Table VI. The exemplary formulations with two glycol ether solvents have better antimicrobial efficacy performance than the formulations with just one glycol ether solvent. The antimicrobial efficacy results are unexpected in that the exemplary cleaning compositions with decanol in conjunction with two glycol ether solvents appear to have the best antimicrobial efficacy. In one embodiment of the invention, the composition has at least two glycol ether solvents in a combined amount of about 1 to about 4% by weight. The ratio of the first glycol ether solvent to the second glycol ether solvent is about 3:1 to 1:3. The decanol solvent is included in the exemplary formulations at about 0.1 to 1% by weight. The ratio of the decanol solvent to glycol ether solvents is about 1:10 to 1:3.

Increasing the level of sulfonate surfactant improved antimicrobial efficacy, but negatively affected the eye toxicity. These exemplary formulations in Table VI show that relatively small changes in specific solvent levels and surfactant levels can have a significant impact on antimicrobial efficacy and eye toxicity results in a manner that cannot be easily predicted or discovered. With less than 1% by weight of citric acid, which is the only antimicrobial component in these exemplary formulations, the selection of surfactant and solvents is particularly important. In some of these exemplary formulations, a relatively small change in the surfactant or solvent can make the difference between passing the *Staphylococcus aureus* antimicrobial efficacy test for disinfection or not.

TABLE VI

| Ingredient | Ex. 11 Active in Product by wt. % | Ex. 12 Active in Product by wt. % | Ex. 13 Active in Product by wt. % | Ex. 14 Active in Product by wt. % | Ex. 15 Active in Product by wt. % | Ex. 16 Active in Product by wt. % | Ex. 17 Active in Product by wt. % |
|---|---|---|---|---|---|---|---|
| Citric Acid | 0.73 | 0.73 | 0.73 | 0.73 | 0.73 | 0.73 | 0.73 |
| Secondary Alkane Sulfonate | 0.45 | 0.45 | 0.45 | 0.6 | 0.45 | 0.6 | 0.6 |
| Ethylene glycol monohexyl ether | 1.3 | 1.17 | 1.04 | 1.04 | 1.04 | 1.3 | 1.43 |
| Ethylene glycol phenyl ether | 1.0 | 0.9 | 0.8 | 0.8 | 0.8 | 0 | 0 |
| Decanol | 0 | 0 | 0 | 0 | 0.3 | 0.3 | 0 |
| Fragrance | 0.1 | 0.1 | 0.1 | 0.1 | 0.1 | 0.1 | 0.1 |
| Poly DADMAC | 0.05 | 0.05 | 0.05 | 0.05 | 0.05 | 0.05 | 0.05 |
| Polyacrylic acid | 0.1 | 0.1 | 0.1 | 0.1 | 0.1 | 0.1 | 0.1 |
| Defoamer | 0.01 | 0.01 | 0.01 | 0.01 | 0.01 | 0.01 | 0.01 |
| Water | Balance | Balance | Balance | Balance | Balance | Balance | Balance |
| Antimicrobial efficacy for *S. Aureus* (contact time in min., # positive carriers out of 60 tested) | 3:30, 1 | 4:30, 3 | 4:30, 0 | 4:30, 1 | 4:30, 3 | 4:30, 7 | 4:30, 3 |
| Eye toxicity (minutes) | <2 | 7.05 | 4.43 | 6.79 | 10.45 | 11.85 | 7.97 |

The acidic cleaning compositions shown in Table VII show an exemplary formulation that may be provided as a ready-to-use spray disinfectant cleaner. In this embodiment of the invention, there is a nonionic surfactant and an anionic surfactant. In this embodiment of the invention, there is only one glycol ether solvent and the composition is free from any other solvents, except water. The exemplary acidic cleaning formulation from Table VII also demonstrates good cleaning efficacy, antimicrobial efficacy for disinfection claims against the *Staphylococcus aureus* with a contact time of less than 10 minutes, less than 5 minutes, less than 3 minutes, or less than 2 minutes.

TABLE VII

| Trade Name | INCI Name | % Activity in Raw Material | Weight % Active in Formula |
|---|---|---|---|
| Water | Water | 100% | Balance |
| Liquinat L50 | Citric Acid (anhydrous) | 50% | 0.5-3% |
| APG 325N | Alkylpolyglucoside | 50% | 0.5-3% |
| WeylClean SAS 30 | Secondary Alkane Sulfonate Sodium Salt | 30% | 0.01-0.5% |
| Fragrance | Fragrance | 100% | 0.01-0.5% |
| Dowanol TpNB | Tripropylene Glycol n-Butyl Ether | 100% | 0.5-1% |

The acidic cleaning composition shown in Table VIII is an exemplary formulation that may be provided as a thickened manual toilet bowl disinfectant cleaner. In this embodiment of the invention, there is a nonionic surfactant and an anionic surfactant. In this embodiment of the invention, the composition is free or substantially free of glycol ethers and any alcohol solvents. There may be a small amount of alcohol solvent in the fragrance, but the level would be less than 0.1% or less than 0.05% or less than 0.01%. The pH of the inventive toilet bowl cleaner is about 1-5, preferably 2-4, or more preferably 2-3.

TABLE VIII

| Compound | Function | Trade Name | Wt % Active |
|---|---|---|---|
| Citric Acid | Active ingredient | Liquinat 50 | 3-10% |
| Sulfonic acids, C10-C18-Alkane | Surfactant | Weylclean SAS 30 | 0.5-3% |
| Alkoxylated Alcohol C10 (EO-PO surfactant) | Surfactant | Lutensol XL-90 | 0.5-3% |
| Hydroxyethylcellulose | Thickener | Natrosol 250 MHBR PA | 0.4-1.2% |
| Sodium Hydroxide | pH adjuster | | 0.1-1% |
| Dye | Dye | Liquitint Dye - Multiple | 0-0.1% |
| Fragrance | Fragrance | Multiple | 0-0.5% |
| Water | Diluent | | Balance |

The acidic cleaning composition shown in Table IX is an exemplary formulation that may be provided as a dilutable product. The dilutable product may be, without limitation, a thin aqueous liquid, a non aqueous liquid, a gel, a paste, a powder, one or more compositions contained in a water-soluble film, or a tablet. It may be a part of a delivery system that releases the concentrated composition for dilution into a ready to use disinfecting or sanitizing product. The inventive compositions may also be diluted in a bucket as a floor cleaner or into a toilet bowl for disinfection and sanitization.

In such embodiments of the invention where the composition is to be diluted, the organic acid may be present at 0.03% to 80% of the formula, depending on the dilution factor and the use instructions. In one example of the invention, the dilution instructions would require about a 1:10 to a 1:50 dilution with water depending no the format and the usage instructions. Further, the amount of acid present in the composition, keeping in mind any optional ingredients that may be present, should be in an amount such that the pH of the composition in use is less than about 7, less than about 6, from about 5.0 to about 1.0, from about 4.0 to about 1.5, or from about 3.0 to about 2.0.

TABLE IX

| FUNCTION/ TRADE NAMES | CHEMICAL NAME | Wt % Active in Concentrate | Wt % Active upon dilution to consumer ready to use form |
|---|---|---|---|
| Polymers/Thickeners (Pluriol E 4000 PRILL) | Polyethylene Glycol (MW <10000) | 0-40% | 0-3% |
| Surfactants - Anionic (GLUCOPON 420 UP) | Sodium dodecylbenzenesulfonate | 0-35% | 0-2.5% |
| Amines, pH Adjuster | Monoethanolamine, diethanolamine, triethanolamine, diisopropylamine, etc. | 0-5% | 0-0.4% |
| Surfactants - Nonionic | D-Glucopyranose, oligomeric, decyl octyl glycosides + D-Glucopyranose, oligomeric, C10-16-alkyl glycoside | 0-10% | 0-0.7% |
| Acids - Organic | Citric Acid Anhydrous | 40-80% | 0.3-6% |
| Binders | Starch (Corn starch, cellulose [hydroxyethyl, carboxymethyl, methyl]) | 0-5% | 0-0.4% |
| Solvents- Glycol Ethers (DOWANOL EPH) | Ethylene Phenyl Ether | 0-10% | 0.08% |

TABLE IX-continued

| FUNCTION/ TRADE NAMES | CHEMICAL NAME | Wt % Active in Concentrate | Wt % Active upon dilution to consumer ready to use form |
|---|---|---|---|
| Fillers or effervescent agents | Inorganic Salts (Sodium Chloride, Potassium Chloride, Sodium Carbonate, Calcium Carbonate, Sodium Bicarbonate etc) Starches (Starch, cellulose, microcrystilline cellulose) | 0-5% | 0-0.4% |
| Glidants | Silicates, Cellulose, Silicon Dioxide, Starch | 0-5% | 0-0.4% |
| Fragrance | | 0-5% | 0-0.4% |
| Disintegrants | | 0-5% | 0-0.4% |
| Water | | | Balance |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

We claim:

1. An aqueous liquid acidic cleaning composition comprising:

a. about 0.5% to about 3% by weight of citric acid in liquid aqueous form;

b. about 0.01% to about 0.5% by weight of an anionic surfactant;

c. about 0.5% to about 3% by weight of an alkylpolyglucoside nonionic surfactant;

d. about 0.5% to about 1% by weight of one or more glycol ether solvents wherein the one or more glycol ether solvents comprises tripropylene glycol n-butyl ether;

e. water; and f. optionally, one or more adjuvants comprising one or more of: fragrances or perfumes, waxes, dyes, colorants, solubilizing materials, stabilizers, thickeners, defoamers, hydrotropes, buffers, builders, lotions, mineral oils, cloud point modifiers, polymers, preservatives;

wherein the composition contains substantially no additional disinfectant or sanitizer, including no: other acids, quaternary ammonium antimicrobials, biguanides, peroxides, hypochlorites, or bleaching agents;

wherein the composition has a pH of less than 6.

2. The composition of claim 1, wherein the composition is free of cationic surfactants.

3. The composition of claim 1, wherein the composition is free of nonionic surfactants other than the alkylpolyglucoside.

4. The composition of claim 1, wherein the anionic surfactant comprises at least one of: a sulfate, a sulfonate, or a sultaine.

5. The composition of claim 1, wherein the anionic surfactant comprises a secondary alkane sulfonate.

6. The composition of claim 1, wherein the composition is free of any solvents other than the glycol ether solvent and water.

7. The composition of claim 1, wherein the composition is provided as ready-to-use spray disinfectant cleaner.

8. The composition of claim 1, wherein the composition further comprises a fragrance.

9. The composition of claim 8, wherein the composition includes no more than 0.1% of an alcohol solvent, attributable to the fragrance.

10. The composition of claim 8, wherein the composition includes no more than 0.05% of an alcohol solvent, attributable to the fragrance.

11. The composition of claim 8, wherein the composition includes no more than 0.01% of an alcohol solvent, attributable to the fragrance.

12. The composition of claim 1, wherein the composition has a pH from about 1 to about 5.

13. The composition of claim 1, wherein the composition has a pH from about 2 to about 3.

14. The composition of claim 1, wherein the composition comprises more than 90% water.

15. The composition of claim 1, wherein the composition is void of lactic acid.

16. The composition of claim 1, wherein the anionic surfactant is selected from the group consisting of secondary alkane sulfonates, sodium laureth sulfate, sodium lauryl ether sulfate, and combinations or mixtures thereof.

* * * * *